United States Patent [19]

Hetrick

[11] Patent Number: 4,544,470
[45] Date of Patent: Oct. 1, 1985

[54] ELECTROCHEMICAL PHOTOCATALYTIC STRUCTURE

[75] Inventor: Robert E. Hetrick, Dearborn Heights, Mich.

[73] Assignee: Ford Motor Company, Dearborn, Mich.

[21] Appl. No.: 615,990

[22] Filed: May 31, 1984

[51] Int. Cl.$^4$ .................... C25B 1/00; C25B 11/06
[52] U.S. Cl. .................... 204/248; 204/78;
204/79; 204/128; 204/129; 204/157.1 R;
204/DIG. 3; 429/111
[58] Field of Search .................... 204/78, 79, 128, 129,
204/157.1 R, 158 R, 242, 248, 275, 278, DIG. 3;
429/111

[56] References Cited

U.S. PATENT DOCUMENTS 4,094,751 6/1978 Nozik .................... 204/80

FOREIGN PATENT DOCUMENTS 53-77188 7/1978 Japan .................... 429/111

OTHER PUBLICATIONS

"Photoelectrochemistry and Heterogeneous Photocatalysis at Semiconductors" by Allen J. Bard, *Journal of Photochemistry*, 10, (1979), pp. 59–75.

"Photoelectrochemistry" by Allen J. Bard, *Science*, vol. 207, No. 4427, Jan. 1980, pp. 139–144.

"Visible Light Induced Cleavage of Water into Hydrogen and Oxygen in Colloidal and Microheterogeneous Systems" by John Kiwi et al., *Structure and Bonding 49*, (1982), pp. 37–39 and pp. 101–125.

*Primary Examiner*—Aaron Weisstuch
*Attorney, Agent, or Firm*—Peter Abolins; Robert D. Sanborn

[57] ABSTRACT

A planar photoelectrochemical structure includes a thin, porous layer of semiconductor powder material on a catalytic film. Using incident light absorbed by the semiconductor, the structure is suited to photosensitizing redox reactions of substrates introduced to the structure in an aqueous gas-phase environment. Conducting catalyst films allow significant external electrical interaction with the photoelectrochemical process occurring in the layer.

7 Claims, 6 Drawing Figures

ELECTROCHEMICAL PHOTOCATALYTIC STRUCTURE

BACKGROUND OF THE INVENTION

1. Field of the Invention

This invention relates to structures employing semiconductor powders and thin catalyst films which can photosensitize chemical reduction-oxidation (redox) reactions.

2. Prior Art

FIG. 1 shows a schematic diagram of a prior art, conventional photoelectrochemical cell 10 in which a semiconductor 11 of macroscopic dimensions is connected by an external circuit 12 to a counter electrode 13. Both semiconductor 11 and counter electrode 13 are immersed in an electrolyte solution 14, advantageously aqueous, which contains chemical species (redox species identified as D− and A+) which are subject to either oxidation or reduction reactions that occur with the transfer of electronic charge at the surfaces of semiconductor 11 and counter electrode 13.

Light of energy greater than the energy of the semiconductor electron bandgap is made to illuminate the semiconductor. As a result, pairs of free electrons 15 and holes 16 are generated near the illuminated surface. Under appropriate conditions for the energy level position of the redox levels in the electrolyte relative to the conduction and valence band energy positions in the semiconductor, the electrons and holes can transfer to the redox species thereby effecting the redox reactions. The various processes and conditions involved are discussed by H. Gerischer in *Physical Chemistry—An Advanced Treastise*, H. Eyring, D. Henderson, W. Jost. Eds. (Academic Press, New York, 1970), pp. 463–542.

FIG. 1 illustrates a typical situation for an n-type semiconductor where surface electric fields caused by the equilibration between electrolyte redox levels and the semiconductor Fermi level draws photoinduced holes to the semiconductor surface to oxidize redox species D− to D while electrons pass through the external circuit to reduce A+ to A at the counter electrode. At steady state, the electronic current $I_e$ in the external circuit is matched by an equal and opposite ionic current $I_i$ in the electrolyte. In summary, the semiconductor acts as a photosensitizer for carrying out the reaction D−+A+→D+A. For example, $TiO_2$ sensitized photodecomposition of formic acid and other carboxylic acids in aqueous environments is well known.

Such photoelectrochemical cells have a number of applications. Using the example of FIG. 1, if the reduced species is at a higher energy than the oxidized species, there is a net change of incident radiant energy as chemical energy, as in a photoelectrosynthetic cell. The photoelectrochemical splitting of $H_2O$ is an example. If the reduced species is at a lower energy than the oxidized one, no energy has been stored. Rather the photoelectrochemical system has catalyzed a thermodynamically downhill reaction. An example is the photocatalytic decomposition of acetic acid to methane and carbon dioxide.

In a regenerative cell, the species oxidized at the semiconductor is also reduced at the counter electrode so that there is no net change in the energy stored in the electrolyte. However, the current in the external circuit can be used to drive an electrical load, as in a photovoltaic cell. These and other device possibilities have been described by Bard (A. J. Bard, *Science* 207, 139 (1980)).

One advantage of the photoelectrochemical cell over the solid state photovoltaic cell is that it is produced quickly by simply immersing the semiconductor in the electrolyte. Secondly, light is absorbed in the region of the surface electric field of the semiconductor which causes the electron and hole to separate before they recombine. In solid state cells, the high electric field separation region is frequently at a greater distance from the surface of the semiconductor. This necessitates higher quality and higher cost material so as to allow the carriers to diffuse to this region before they recombine.

A microscopic version of a prior art photoelectrochemical cell is shown schematically in FIG. 2. Here microscopic semiconductor powder grains 20 are dispersed in an electrolyte solution 21 again containing redox species D− and A+. Typically, these powder grains are submicron in dimension. The external circuit and counter electrode of FIG. 1 are replaced by a piece of catalytic material 22, typically a metal such as platinum, attached to a region of the semiconductor. The attachment can be accomplished by photochemical means. When the powder dispersion is illuminated, processes occur similar to those described for the macroscopic system of FIG. 1. Holes are drawn to the semiconductor surface where they oxidize D− while electrons move to the catalyst region where they reduce A+. The electronic flow in the grain amounts to an electronic current $I_e$ while the current loop is completed in the electrolyte by ionic current $I_i$. Thus, the grains act as microscopic short-circuited photoelectrochemical cells. The powder has the advantage of providing much more reactive surface area. A disadvantage is not having an external circuit essential for photovoltaic and other electrical device applications. Writings by Gratzel et al (J. Kiwi, K. Kalyanasundaram, and M. Gratzel, *Structure and Bonding* 49, Springer-Verlag, Berlin, p. 37, (1982)) and Bard (A. J. Bard, *J. of Photochem.* 10, 59 (1979)) discuss many of the details of the microscopic system and the numerous modifications that can be attempted to make the system more effective under different circumstances.

SUMMARY OF THE INVENTION

The present invention includes an electrochemical photocatalytic structure for the photogeneration of complimentary oxidation and reduction products when exposed to light of appropriate wavelengths in the presence of suitable reactants. For example, the reactant can be water with oxygen and hydrogen being the oxidation and reduction products, respectively. The structure includes a porous layer (typically several microns in thickness) of semiconducting powder which is positioned above a thin film of material which catalyzes either the oxidation or reduction half reactions that occur simultaneously within the structure. The porous layer may be dosed with an electrolyte (appropriate for the desired photochemistry) to increase the ionic conductivity within the pore volume of the layer.

The structure is advantageous for photosensitizing reactions in which the reactant is introduced to the porous layer from an ambient gas phase. Light incident on the outer surface of the powder layer creates electron hole pairs in this region. These carriers separate within the porous layer with the photogenerated minority carriers remaining near the outer surface while the excess majority carriers accumulate near the interior surface. Under appropriate energy conditions, the separated carriers take part in redox reactions. The electrical loop between the substrate and the outer surface of the porous layer of semiconductor powder can be closed by ionic conduction through the electrolyte in the pore volume.

A structure in accordance with an embodiment of this invention is advantageous. First, the advantages of using powders are retained without the requirement of placing submicron catalyst deposits on each grain in order to drive the desired redox reactions at a suitable rate. Second, the powder layers can be selectively deposited on the surface of the catalyst film to define regions of one powder material or to define different powder materials in adjacent regions. This flexibility allows for the fabrication of more complex photoelectrochemical structures and devices. Third, external electrical circuitry can be connected to conductive catalyst films. This provides electrical contact to the powder layer and the ability to electrically monitor the photoelectrochemical process so that it may be optimized.

DETAILED DESCRIPTION OF THE INVENTION

Figure 1:
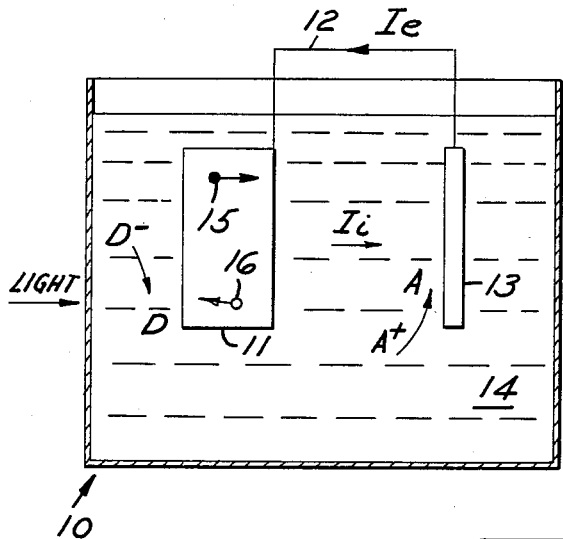
FIG. 1 is a schematic drawing illustrating the operation of a macroscopic photoelectrochemical cell in which an n-type semiconductor material is illuminated causing redox species $D-$ to be oxidized at a semiconductor surface while species $A+$ is reduced at a counter electrode, in accordance with the prior art.
Figure 2:
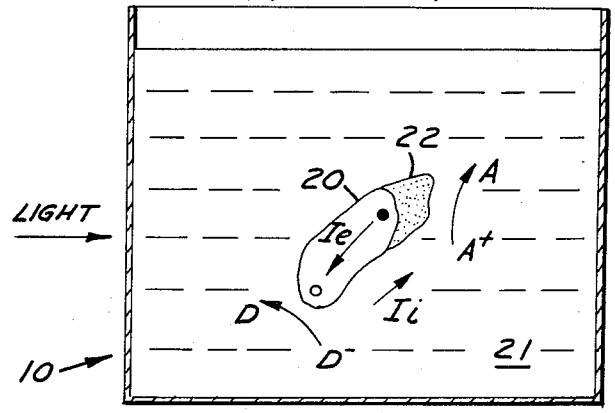
FIG. 2 is a schematic drawing illustrating the operation of microscopic photoelectrochemical cells having catalyst treated submicron grains of semiconductors immersed in an electrolyte solution, in accordance with the prior art.
Figure 3:
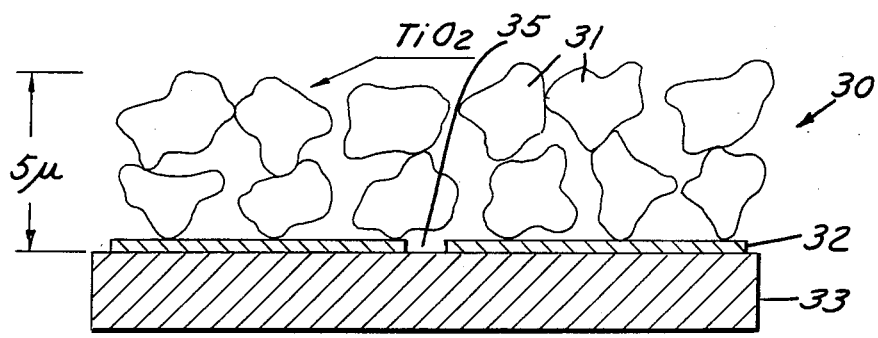
FIG. 3 is a cross section of a powder layer photoelectrochemical structure having a porous semiconductor layer overlaying a catalytic film supported by a substrate, in accordance with an embodiment of this invention.

Referring to FIG. 3, a powder layer structure 30 has a semiconducting $TiO_2$ powder 31 above a sputtered platinum catalyst film 32 on a substrate 33. To use a specific example, the structure could be used to photosensitize the decomposition of formic acid ($HCOOH \rightarrow H_2 + CO_2$). This reaction is thermodynamically downhill and the structure acts as a photocatalyst. An n-type semiconductor powder layer is appropriately treated to promote an oxidation half reaction of an adjacent chemical reactant, while the catalyst film promotes a reduction half reaction of an adjacent chemical reactant. A p-type semiconductor powder layer is appropriately treated to promote a reduction half reaction of an adjacent chemical reactant, while the catalyst film promotes an oxidation half reaction of an adajcent chemical reactant. Appropriate treating of the semiconductor can include, for example, heating the semiconductor in the presence of hydrogen.

In a typical sample, $TiO_2$ grains are dispersed in a porous layer with an average thickness ranging from $1-20\mu$. This layer rests on a sputtered Pt film (approximately $0.1\mu$ thick) supported by a convenient substrate. A narrow stripe 35 opened in the Pt film permits measurement of the resistivity of the overlaying layer of powder 31. The $TiO_2$ is in a powder form with an anatase crystal structure. A typical source of such a powder is Matheson, Coleman and Bell (MCB) with a grain size of approximately $0.2\mu$ or Degussa P-25 with a grain size of approximately $0.02\mu$. The grains are made semiconducting (n-type) by reducing them in an $H_2$ atmosphere at 600° C. for several hours. The structure is quickly prepared by dispersing the powder in a polymeric binder such as methyl methacrylate dissolved in an organic solvent and spinning the solution onto the metallized substrate. The binder is burned off at 250°–300° C. leaving the layer available for further treatment. The detailed morphology of the layer depends on several factors including degree of dispersion, spin rate (>2000 rpm), etc. It is common for the grains (MCB material) to be partially clumped as larger irregular particles with a characteristic dimension on the order of $1\mu$. Pore dimensions are comparable at about $1\mu$. The porosity of the layer is estimated at 75%. A typical porosity for a semiconductor powder layer is about 50% to about 75% with a typical grain size less than about 1 micrometer to about 0.02 micrometer.

The photochemical properties of the structure are investigated by placing a 2 cm$^2$ sample into a 0.20 liter vacuum chamber which is evacuated and then filled with HCOOH at a pressure near its vapor pressure and at an operating temperature of $\sim 25°$ C. The chamber is equipped with an optical port so that uv photons (supplied, for example, by a 200 watt mercury lamp) illuminate the structure. The optical port includes filters, such as water and colored glass, so that the flux of photons passing through the optical port have an energy above the bandgap energy of the powder (3.1 eV). That is, the filters reduce the light passing through the optical port to photons which are useful in promoting photochemical reactions. A typical photon flux is $2 \times 10^{16}$ sec$^{-1}$. A bellows pump circulates the reactant and product gases in a closed loop. A sampling capillary followed by a cold trap near dry ice temperature passes only $H_2$ and $CO_2$ so that the increase in concentration of $H_2$ and $CO_2$ can be monitored by a mass spectrometer.

To realize high efficiencies, the structure is treated with an electrolyte. For example, aqueous potassium hydroxide can be introduced into the pore volume and then dried to leave small grains of potassium hydroxide in the pore volume. Good results are obtained by dosing the powder layer with approximately 0.2 ml of $10^{-2}$M NaOH and drying slowly. Subsequently, in the presence of gaseous $H_2O$ and HCOOH, the result is presumably an aqueous solution of HCOONa in the pore volume of the layer. If the volume is completely filled, the electrolyte is on the order of 5M. The presence of the electrolyte is detected by resistivity measurements using the open-stripe geometry. Such dosing produces significant ionic conductivity which is correlated with high photochemical activity.

Figure 4:
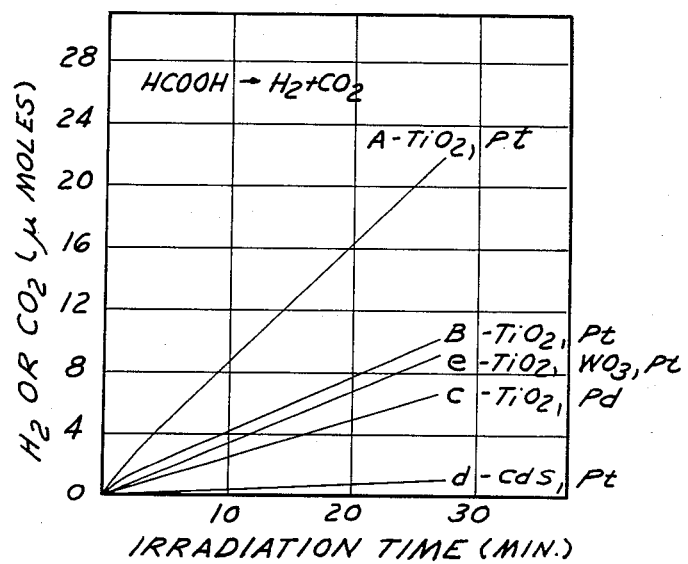
FIG. 4 is a graphical representation of the initial amounts of $H_2$ and $CO_2$ photogenerated versus irradiation time for a number of powder layer parameters when formic acid is used as a reactant: (a) $TiO_2$ ($2\mu$) over Pt; (b) $TiO_2$ ($20\mu$) over Pt, (c) $TiO_2$ ($3\mu$) over Pd, (d) CdS ($5\mu$) over Pt, (e) $TiO_2$ ($3\mu$) over $WO_3$ ($3\mu$) over Pt in accordance with embodiments of this invention.

FIG. 4 shows the initial rate of $H_2$ growth for a number of different parameters which help illustrate the mechanism of the structure of FIG. 3. In each case, the initial partial pressures are approximately 10 Torr of HCOOH and approximately 20 Torr of $H_2O$. The rate of $CO_2$ growth is nearly identical to that of $H_2$, consistent with the stoichiometry of the reaction. Curve A shows a high rate of growth, corresponding to a quantum efficiency of approximately 40%, for a $2\mu$ thick film of MCB, $TiO_2$ over Pt. The reaction rate drops by more than a factor of $10^2$ without the Pt demonstrating its catalytic effect. Curve B shows the effect of increasing the layer thickness of $20\mu$. Although the rate is reduced it is still significant. Since most of the light is absorbed in the outer $1\mu$ of the direct gap $TiO_2$, the photocatalytic mechanism must account for the spatial projection of the effect of Pt. Curves C and D show that other materials can be used. Numerous metals including Pd are effective. Some other n-type semiconducting powders including CdS, $Ta_2O_5$ and $SrTiO_3$ are also effective. Semiconducting $WO_3$ over Pt is substantially ineffective. A $TiO_2$ layer over a $WO_3$ layer (formed by sequentially spinning $WO_3$ and $TiO_2$ layers before binder burnoff) is effective, (see curve E). Finally, no significant photoeffects are observed with below bandgap photons or without a semiconductor powder.

Figure 5A:
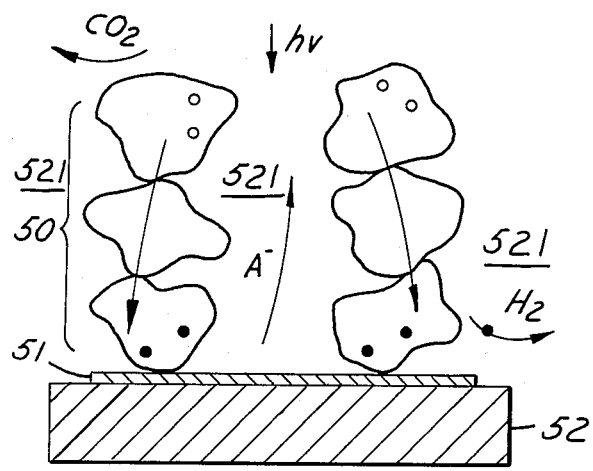
FIGS. 5A and 5B are schematic diagrams for a planar photoelectrochemical model, and an electrical circuit, respectively, in accordance with an embodiment of this invention, for n-type grains in which a coparallel flow of electronic (grains) and ionic (pores) currents results in a spatially dispersed but electrically closed current ($J_P$) loop which supports redox reactions at the upper and lower regions of the porous layer.

FIG. 5A illustrates a model, the planar analogue of that which describes the response of metallized powders, that can qualitatively account for the results. A porous powder layer 50 over a catalytic film 51 on a substrate 52 acts as a short-circuited photoelectrochemical cell. Photons having above bandgap energy produce electron-hole pairs near the outer region of the powder layer 50. In the presence of an electrolyte 521, surface fields within the n-type grains of layer 50 draw the holes to the outer surface of layer 50 where the holes can oxidize absorbed species (formate ions or formic acid) to form $CO_2$. Electrons migrate to the vicinity of substrate 52 by means of grain contacts. with the catalytic assistance of Pt of film 52, electrons are able to reduce $H_2O$ to $H_2$. The electrical loop is closed by a net migration of ionic species of appropriate sign through the pore volume (or on the outer surface of the grains) of layer 50 in the direction perpendicular to the plane of catalytic film 51.

Figure 5B:
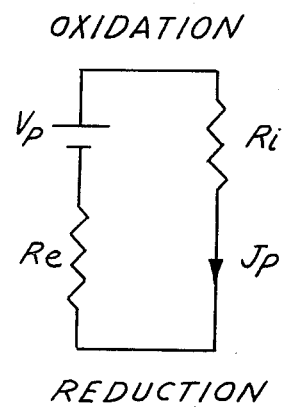

Referring to FIG. 5B, the steady-state electrical model corresponding to FIG. 5A is that of a photovoltage, $V_p$, resulting from the electronic charge separation in series with electronic ($R_e$) and ionic ($R_i$) impedances. Leaving aside the more complex transient photoresponse, the maximum steady-state current flux, $J_p$, corresponding to curve A amounts to approximately 1 $mA/cm^2$. Using the open-stripe geometry, one can estimate a photoinduced electronic resistivity on the order of $10^5$ to $10^4$ ohm-cm with a comparable ionic resistivity. Since conduction path lengths are only a few microns, $V_p$ values on the order of a few tenths of a volt (see below) are adequate to support the current at these resistivity values.

The model of FIG. 5B accounts for the catalytic influence of the Pt, the electrolyte requirement, and accommodates the disparity between layer thickness and optical absorption depth. Corroborating the photoelectrochemical model of FIG. 5A is the absence of photodecomposition with semiconducting $WO_3$ since its conduction band is positive of the $H_2/H^+$ redox level in aqueous solutions. The fact that photoactivity is strong with a $WO_3$ layer beneath a $TiO_2$ layer demonstrates the importance of electronic conduction through the grains. Photoactivity is greatly reduced when a layer of insulating $Al_2O_3$ is placed below the $TiO_2$, presumably due to the absence of electronic conductivity.

A variety of chemical reactions are possible using the general structure shown in FIG. 5A. For example, if a $TiO_2$ layer is dosed with an alkali hydroxide and placed above a platinum film in the sole presence of gaseous water vapor, water is observed to decompose into $H_2$ and $O_2$. This is an energy storing reaction.

Various modifications and variations will no doubt occur to those skilled in the various arts to which this invention pertains. For example, the semiconductor grain size and the associated structural components may be varied from that disclosed herein. These and all other variations which basically rely on the teachings through which this disclosure has advanced the state of the art are properly considered within the scope of this invention.

I claim:

1. An electrochemical photocatalytic structure for photosensitizing chemical reduction-oxidation reactions including:

a substrate means for providing physical support for said structure;

a film of catalyst material deposited on said substrate means;

a porous layer of semiconductor powder adjacent said catalyst material, and adapted for photoactivity wherein said semiconductor powder layer has a porosity of about 50% to about 75% and has a grain size less than about 1 micrometer to 0.02 micrometer, at least some of said semiconductor powder grains are in contact with said film of catalyst material, and at least a portion of said film of catalyst material is uncovered by said semiconductor powder grains so as to be exposed for electrochemical reaction; and said semiconductor powder including spaced grains of semiconductor material to provide a pore volume so as to pass a chemical reactant which is subjected to a photochemical reduction-oxidation reaction when said structure is illuminated with light having a wavelength with an energy above the electron bandgap energy of said semiconductor material so that both electron and hole carriers are created in said layer of semiconductor powder.

2. An electrochemical photocatalytic structure as recited in claim 1 further including:

an electrolyte material added to said porous layer of semiconductor powder so that said pore volume becomes ionically conducting in the presence of an appropriate chemical reactant.

3. An electrochemical photocatalytic structure as recited in claim 2 wherein:

said grains of semiconductor material are an n-type semiconductor material with a surface adapted to promote an oxidation half reaction of the chemical reactant adjacent said grains of semiconductor material; and said film of catalyst material is adapted to promote a reduction half reaction of the chemical reactant adjacent said catalyst material.

4. An electrochemical photocatalytic structure as recited in claim 3 where said semiconductor powder layer is n-type $TiO_2$, said catalyst material film is platinum, said electrolyte in the pore volume is an alkali hydroxide, and said chemical reactant is water so that upon illumination, the water is converted into $H_2$ and $O_2$.

5. A structure as recited in claim 3 wherein said semiconductor powder layer portion is n-type $TiO_2$, said reactant is formic acid, said electrolyte is sodium formate and said catalyst material film is platinum.

6. An electrochemical photocatalytic structure as recited in claim 2 wherein:
said grains of semiconductor material are a p-type semiconductor with a surface adapted to promote a reduction half reaction of the chemical reactant adjacent said grains of semiconductor material; and
said film of catalyst material is adapted to promote an oxidation half reaction of the chemical reactant adjacent said catalyst material.

7. An electrochemical photocatalytic structure as recited in claim 2 wherein the thickness of said semiconductor powder layer is in the range of about $1\mu$ to $20\mu$.

* * * * *